United States Patent [19]

Grassl

[11] 4,335,317

[45] Jun. 15, 1982

[54] CIRCUIT FOR SENSOR-CONTROLLED TELEMETRY

[75] Inventor: Hans-Peter Grassl, Munich, Fed. Rep. of Germany

[73] Assignee: Siemens Aktiengesellschaft, Berlin & Munich, Fed. Rep. of Germany

[21] Appl. No.: 173,195

[22] Filed: Jul. 25, 1980

[30] Foreign Application Priority Data

Sep. 10, 1979 [DE] Fed. Rep. of Germany ....... 2936521

[51] Int. Cl.³ .............................................. H01J 40/14
[52] U.S. Cl. ................................ 250/578; 307/221 D
[58] Field of Search ............... 250/528, 211 J; 357/24, 357/31, 32; 307/221 D

[56] References Cited

FOREIGN PATENT DOCUMENTS 2838647 9/1978 Fed. Rep. of Germany .

*Primary Examiner*—David C. Nelms
*Assistant Examiner*—Darwin R. Hostetter

*Attorney, Agent, or Firm*—Hill, Van Santen, Steadman, Chiara & Simpson

[57] ABSTRACT

A circuit for sensor-controlled telemetry has two linear image sensors each having a number of sensor elements onto which image sensors portions of corresponding lines of two separately obtained images of an object are projected and a number of evaluators post-connected to the sensor elements each being switchable between two states as a function of the amount of charge optionally generated in the sensor elements, each evaluator having two inputs respectively connected through switching transistors to the outputs of two sensor elements for comparing the charges generated thereby. The two sensor elements connected to each comparator may be adjacent to each other or disposed at a small distance from each other. Each evaluator provides a digital output to a shift register for serially transferring the data to a processing circuit which undertakes a maximum correlation of the data received from the evaluators, and transmits the data to a post-connected display or focusing device.

11 Claims, 12 Drawing Figures

CIRCUIT FOR SENSOR-CONTROLLED TELEMETRY

BACKGROUND OF THE INVENTION

The present invention relates to circuits for sensor-controlled telemetry, and in particular to such a circuit utilizing opto-electronic image sensors for generating charge for production of corresponding digitalized information.

A circuit is known from the German patent application Pat. No. 28 38 647.2 wherein two linear image sensors each having a plurality of sensor elements have a corresponding number of evaluators post-connected to the sensor elements which undertake a digitalization of the sensor signals generated by radiation incident on the sensor elements. The evaluators consist of partial circuits of individual stages of a shift register which undertakes relative position displacements of the sensor signals in the longitudinal direction of the image sensors. The digital evaluation of the sensor signals is undertaken by means of a magnitude comparison of the sensor signals with a reference voltage with which all evaluators are supplied. The result of the magnitude comparison appears at the output of each evaluator in the form of a logical 1 or a logical 0. Thus, the luminosity data which is derived via the sensor elements from each of the two projected line sections from each image sensor is expressed by a plurality of logic signals available at the evaluator outputs which are in turn transmitted to a processing circuit for correlation measurement. In the processing circuit, that position displacement of the logic signals derived from one image sensor with respect to the logic signals derived from the other image sensor at which maximum correlation between the signals occurs is determined.

In circuits of the type described above wherein two linear image sensors are utilized, the image sensors may be matched as close as possible however the sensors will still exhibit differing sensitivities as a result of slight variations in material composition, or the reference voltages allocated to the evaluators may be slightly different for each image sensor or may even vary within one of the image sensors. Any variation such as these results in inaccurate logical data which in turn negatively influences the determination of the maximum correlation in the processing part. Accurate correlation is crucial to precise telemetry or focusing of the object on an image plane so that such variations significantly affect the overall accuracy of the entire device.

SUMMARY OF THE INVENTION

It is an object of the present invention to provide a circuit for sensor-controlled telemetry which substantially minimizes or eliminates errors due to variations in sensor element sensitivity or voltages supplied to the circuit.

The above object is inventively achieved by generating digital evaluator signals which depend solely on the relative luminosity course along the projected line sections on the image sensors and does not depend on the absolute sensitivity of the image sensors. Moreover, each relative luminosity maximum or minimum is identified independently of the magnitude of the reference voltage by means of the logic evaluator signals, so that the reliability and accuracy of the telemetry or focusing is significantly improved.

DESCRIPTION OF THE PREFERRED EMBODIMENTS

Figure 1:
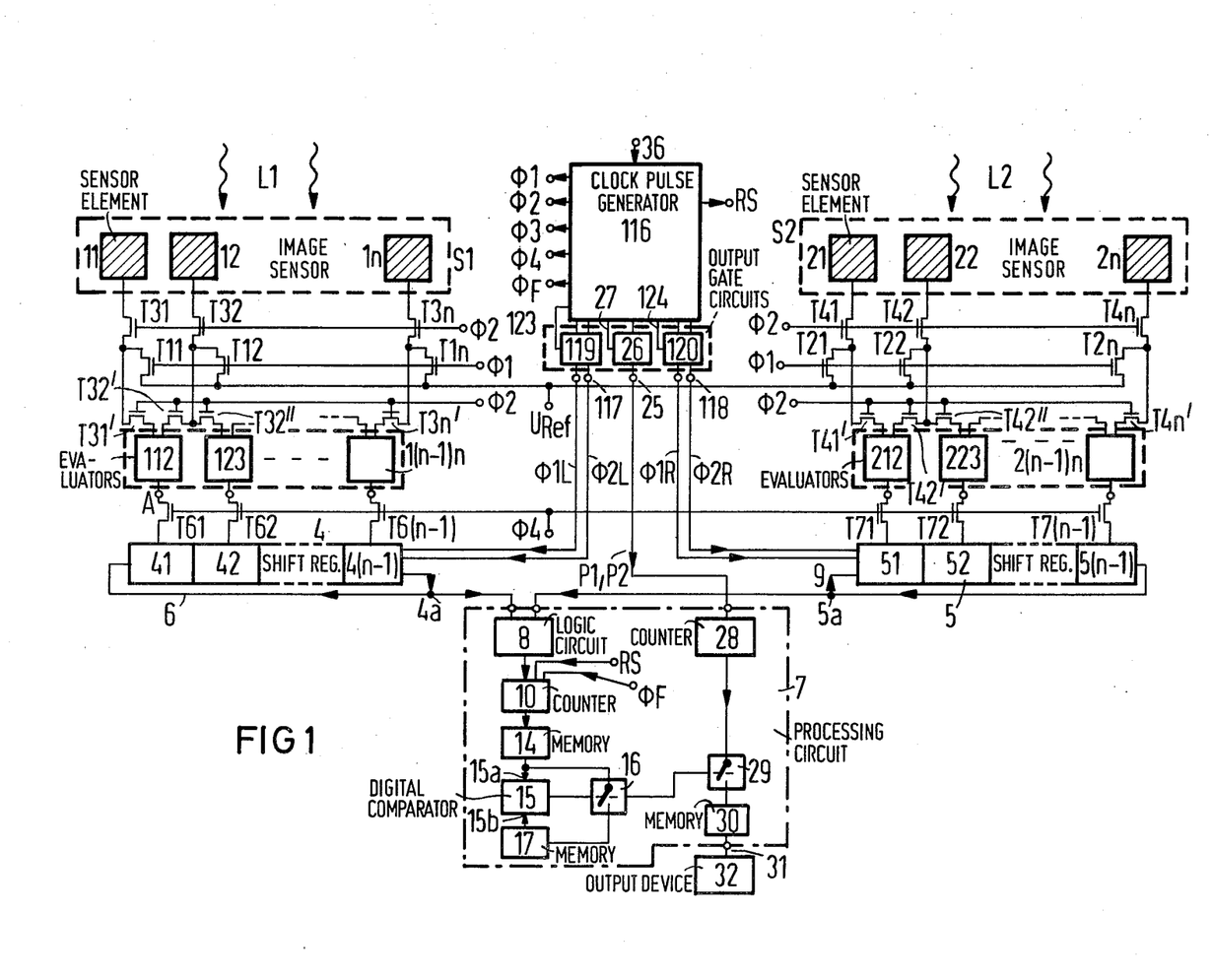
FIG. 1 is a schematic circuit diagram of a circuit for sensor-controlled telemetry constructed in accordance with the principles of the present invention.

A circuit for sensor-controlled telemetry is schematically illustrated in FIG. 1 which has two linear image sensors S1 and S2. The sensor S1 has a plurality of opto-electronic sensor elements 11, 12, 13 ... 1n and the sensor S2 has a like number of opto-electronic sensor elements 21, 22, 23 ... 2n. The image sensors S1 and S2 are integrated on a doped semiconductor body of a first conductivity type. If the sensor elements are photodiodes, the shaded areas shown in FIG. 1 represent areas of a second conductivity type opposite to that of the semiconductor body, which areas are arranged at the boundary surface of the semiconductor body. Radiation L1 is incident on the image sensor S1 and radiation L2 is incident on the image sensor S2.

The sensor elements 11 through 1n are respectively connected through individually allocated switching transistors T11 through T1n and T31 through T3n to a terminal connected to a constant voltage $U_{Ref}$. Similarly, the sensor elements 21 through 2n are respectively connected through individually allocated switching transistors T21 through T2n and T41 through T4n to the constant voltage $U_{Ref}$. The gate electrodes of the switching transistors T11 through T1n and T21 through T2n are respectively connected to a common terminal to which a clock pulse voltage $\phi1$ is supplied, and the gate electrodes of the switching transistors T31 through T3n and T41 through T4n are respectively connected to a common terminal to which a clock pulse voltage $\phi2$ is supplied.

Adjacent sensor elements such as, for example, sensor elements 11 and 12, are connected to the two inputs of an evaluator such as, for example, evaluator 112 through switching transistors such as T31 and T32 and T31' and T32'. The switching transistors T31' and T32' are part of another set of switching transistors, which includes the transistor T32" through the transistor T3n' which have gate electrodes connected at a common terminal to the clock pulse voltage $\phi 2$. The further evaluators for the image sensor S1 are designated by a three digit number beginning with the number 1 followed by numbers corresponding to the sensor elements evaluated thereby which can be generally represented as $1(n-1)n$.

Figure 2:
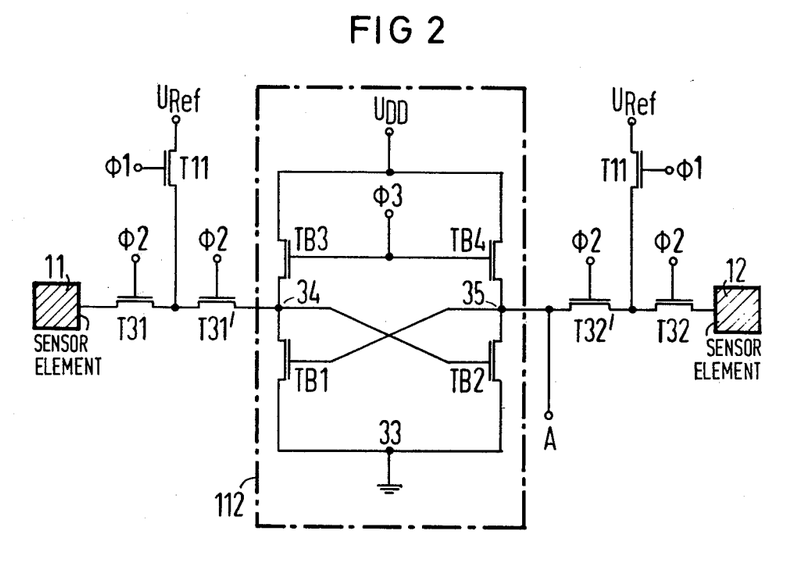
FIG. 2 is a detailed circuit for one of the evaluators shown in FIG. 1.

An identical arrangement exists for the image sensor S2 which has adjacent sensor elements connected to evaluators 212 through $2(n-1)n$ through the transistors T41 through T4n and R41' through T4n'. The set of switching transistors T41' through T4n', which includes transistors such as T41" have gate electrodes connected at a common terminal to the clock pulse voltage $\phi 2$. The evaluators 112 through $1(n-1)n$ and 212 through $2(n-1)n$ operate as comparators, and a circuit which may be used for these evaluators is shown in FIG. 2 and will be described in greater detail below.

Depending upon the size ratios of the sensor signals supplied to each of the inputs of the evaluators, the evaluators can assume one of two possible switching states. A digitalized output signal appears at output A of each evaluator and those signals for the purposes of the following discussion will be designated for evaluators 112 through $1(n-1)n$ as S112 through $S1(n-1)n$ and for the evaluators 212 through $2(n-1)n$ as S212 through $S2(n-1)n$. These signals assume either the logic value 1 or 0 depending on the switching state of the respective evaluators. The signals at the outputs A are supplied through respective sets of switching transistors T61 through $T6(n-1)$ and T71 through $T7(n-1)$, each having a gate electrode connected to a common clock pulse voltage $\phi 4$, to the inputs of individual stages 41, 42 through $4(n-1)$ and 51, 52 through $5(n-1)$ of two shift registers 4 and 5 which are individually allocated to each of the image sensors S1 and S2. The shift registers 4 and 5 are dynamic, two-phase shift registers.

The shift register 4 has two inputs which are connected to clock pulse voltages $\phi 1L$ and $\phi 2L$, whereas the shift register 5 has two inputs to which clock pulse voltages $\phi 1R$ and $\phi 2R$ are supplied. In the shift register 4, the output 4a of the stage $4(n-1)$ is connected to the input of the stage 41 via a line 6 and is connected as well to the first input of a logic circuit 8 which is contained in a processing circuit or stage 7. An output 5a of the stage $5(n-1)$ of the shift register 5 is connected in an analogous manner via a line 9 to the input of the stage 51 and is also connected to a second input of the logic circuit 8.

Within the processing circuit 7, the logic circuit 8 is followed by a post-connected counter 10 having a terminal RS' for receiving a reset pulse and a connection for receiving a clock pulse $\phi F$. The counter 10 has an output connected to a first memory 14 which has an output connected to a first input 15a of a digital comparator 15 as well as to a second memory 17 through an electronic switch 16. The electronic switch 16 is controlled by the digital comparator 15 which has a second input 15b connected to the output of the second memory 17.

A clock pulse generator 116 generates a plurality of different clock pulse voltages including $\phi 1$, $\phi 2$, $\phi 3$, and $\phi 4$ as well as $\phi F$ and a reset pulse for the counter 10, this reset pulse being supplied at a terminal RS. The clock pulse generator 116 has a triggering input 36 for receiving a signal from control circuitry not illustrated herein. The generator 116 further supplies clock pulse voltages $\phi 1L$ and $\phi 2L$ at an output pair 117 through an output gate 119, and supplies clock pulse voltages $\phi 1R$ and $\phi 2R$ at an output pair 118 through an output gate 120. The clock pulse generator 116 further supplies pulses P1, P2 . . . at an output 25 through an output gate 26 to a counter 28 in the processing stage 7. The output gates 119, 26 and 120 are respectively controlled by lines 123, 27 and 124 in a manner more fully described below.

The counter 28 is connected through an electronic switch 29, which is also controlled by the digital comparator 15, to a third memory 30. The third memory 30 has an output 31 which forms the output for the processing stage 7 which is connected to the input of an output device for converting signals operational for range indicating or range finding, more fully described below.

A circuit for the evaluators 112 through $1(n-1)n$ and 212 through $2(n-1)n$ is shown in FIG. 2 on the basis of the evaluator 112. The circuit is a flip-flop circuit with the switching transistors TB1 and TB2 and the transistors TB3 and TB4 operated as switchable load elements. The source terminals of the transistors TB1 and TB2 are connected via a common terminal 33 to the reference potential of the circuit and the drain terminals of TB3 and TB4 are connected via a common terminal to a supply voltage $U_{DD}$. The input node of the evaluator 112 is referenced at 34 and the output node, connected to the output A, is referenced at 35. A cross-coupling exists between the gate electrodes of the transistors TB1 and TB2 and the nodes 34 and 35. The gate electrodes of the transistors TB3 and TB4 are connected to a clock pulse voltage $\phi 3$ via a common terminal. The remaining circuit elements shown in FIG. 2 were identified in connection with FIG. 1 and bear identical reference numerals.

The principle of telemetry or range finding utilized by the circuit disclosed herein is based on the fact that two separate imagings of an object are gained by two optical systems whose range-dependent relative positions are then evaluated. The radiation in the form of light rays L1 proceed from the object whose range is to be determined and, via a first optical system, project an imaging of the object on the plane of the image sensor S1 in such a manner that the image sensor S1 is aligned to a line section of the imaging. The radiation in the form of light rays L2, which are gained via a second optical system from the object, project a second imaging of the object onto the plane of the image sensor S2 in an analogous manner, namely, in such a manner that the image sensor S2 is directed to the same line section when the object is situated at a predetermined distance which may, for example, be infinity. If the distance of the object changes with respect to the predetermined value, the line sections projected onto the image sensors S1 and S2 are accordingly displaced in the longitudinal direction of the image sensors. The size of the mutual displacement thereby represents a measure of the actual range of the object. A similar method of telemetry in which the relative displacements of two imagings of the object are utilized, but in which planar arrangements of photodiodes are provided instead of linear image sensors is generally described, for example, in the periodical "Electronics" Nov. 10, 1977 at pages 40 through 44.

The specific manner of functioning of the circuit shown in FIGS. 1 and 2 will now be described in combination with the voltage/time diagrams shown in FIG. 3. A trigger pulse supplied to the input 36 of the clock pulse generator 116 begins a measurement cycle and causes first a clock pulse $\phi1$ and a pulse $\phi2$ to be emitted by the generator 116. The sensor elements such as, for example, sensor element 11, are thereby reset to the constant voltage $U_{Ref}$. The transistors T31' and T32' are in a conductive state as a result of the application of the pulse $\phi2$ so that the input node 34 and the output node 35 of each evaluator, such as the evaluator 112, are also reset to the constant voltage. When the clock pulse $\phi1$ is switched off, charge carriers generated by the incident radiation L1 and L2 begin to collect in the sensor elements which results in a voltage drop in those sensor elements. The potential at the allocated input nodes of the evaluators, for example node 34, is reduced in an amount directly proportional to the amount of optically generated charges respectively collected in the sensor elements. That is, the potential drop will increase with increased charge carrier generation. The time span between the end of the clock pulse $\phi1$ at a time t1 and the end of the pulse $\phi2$ at a time t2 is designated as the integration time. Optically generated charges are collected in the sensor elements only during the integration time. After termination of the pulse $\phi2$, a clock pulse $\phi3$ supplied by a further output of the generator 116 is applied to the gate electrodes of transistors TB3 and TB4, so that the flip-flop circuits of the evaluators are activated. In the case where a greater potential drop occurred at the node 34 in comparison with the node 35, a voltage which approximately corresponds to the supply voltage $U_{DD}$ (a logical 1) occurs at the output node, for example node 35. If on the other hand, a greater voltage drop occurs at the node 35 than at the node 34, the node 35 then reaches a potential which approximately corresponds to the reference potential at the terminal 33 (a logical 0). Each evaluator thereby emits a digitalized sensor signal, for example S112, having a value dependent upon the relative size ratio of the optically generated charges in the two sensor elements connected to the evaluator. Upon the occurrence of a further clock pulse $\phi4$, the digitalized sensor signals such as S112 are supplied to the inputs of the allocated stages, for example stage 41, of the respective shift registers 4 and 5 and are stored therein. The clock pulse generator 116 subsequently supplies clock pulse sequences $\phi1L$, $\phi2L$, $\phi1R$ and $\phi2R$ to the shfit registers which respectively shift the sensor signals contained therein by one stage. Before the occurrence of the clock pulses 37 and 38 which belong to a clock period TPL1, the sensor signal S1(n−1)n lies at the output 4a. The clock pulses 37 and 38 shift the sensor signal S1(n−1)n into the stage 41 and the information S1(n−2)(n−1) to the output 4a and so forth. As a result of clock pulses 39 and 40 of the clock period TPL(n−1), the sensor signal S1(n−1)n finally again arrives at the output 4a after a full information cycle. A clock period TPLz having clock pulses 43 and 44 follows, by means of which the sensor signal S1(n−2)(n−1) appears at the output 4a. After a succeeding blanking gap referenced at 45, the clock pulses 46 and 47 of the clock period TPL1' again shift the sensor signals by a further stage so that the signal S1(n−2)(n−1) arrives at the stage 41 and the signal S1(n−3)(n−2) is switched through to the output 4a.

Thus, the sensor signals S1(n−1)n through S112 and S1(n−1)n again are serially output at the output 4a in a first readout cycle Z1 which begins at a time t3 and embraces the clock periods TPL1 through TPL(n−1). In a second readout cycle Z2, which begins with the clock period TPL1', and embraces a further (n−2) clock periods, there ensues a second serial output of all sensor signals of the image sensor 1, whereby there occur at the output 4a the signals S1(n−2)(n−1) and through S1(n−2)(n−1) again. During the first readout cycle Z1, the shift register 5 is likewise supplied with (n−1) clock periods TPR1 through TPR(n−1), whereas the clock pulses 43 and 44 present in the shift registers 4 lack corresponding pulses in the shift register 5. This results in the fact that, at the beginning of the cycle Z2, the sensor signal S2(n−1)n pends at the output 5a while the signal S1(n−2)(n−1) pends at the output 4a. Thus, in the first readout cycle Z1, the signal pairs S1(n−1)n and S2(n−1)n, S1(n−2)(n−1) and S2(n−2)(n−1) etc. are read out to the outputs 4a and 5a. In the second readout cycle Z2, on the other hand, the signal pairs S1(n−2)(n−1) and S2(n−1)n, S1(n−3)(n−2) and S2(n−2)(n−1) etc. are read out at the outputs 4a and 5a. The serially read out information from the shift registers 4 and 5 is thus mutually displaced in two succeeding readout cycles by a respective signal width. After (n−1) readout cycles, they again have the same chronological allocation as in the cycle Z1. In FIG. 1, this displacement is achieved by blocking the gate circuit 120 via the line 124 during the occurrence of the clock pulses 43 and 44, that is, between the clock periods TPR(n−1) and TPR1'. In this time space, the gate circuit 26 is opened via the control line 27, so that one of these pulses 43 or 44, or a pulse derived therefrom, appears at the output 25 as a shift pulse P1. The shift pulse P1 signifies the beginning of a new readout cycle and a mutual shift of the sensor signals serially read out at the outputs 4a and 5a by a respective signal width.

The sensor signal pairs serially read out to the outputs 4a and 5a within an information cycle, for example Z1, are evaluated in the logic circuit 8 according to a logic function by which an output pulse always occurs at the output of the circuit 8 when the digital signals on the input side supplied from 4a and 5a coincide. If the signals do not coincide, no output pulse is emitted by the circuit 8. The logic circuit 8 may also be designed in such a manner so as to only indicate the coincidence of two 1 signals or of two 0 signals at its inputs by an output pulse.

The counter 10, which is reset to 0 before the beginning of each readout cycle, in the blanking gaps 45, then counts the number of coincidences within such a cycle.

The counter 10 is only switched on during a portion of each readout cycle which is determined by the pulse sequence $\phi F$ emitted by the generator 116. If one assumes that the counter 10 counts the coincidences in the readout cycle within the clock periods TPRi through TPRk, whereby the difference k minus i amounts to approximately n/2 or 3n/4, then in the readout cycle Z2 the counter 10 counts the coincidences within the clock periods TPR'(i+1) through TPR'(k+1). If one views the clock pulses designated $\phi F1$ and $\phi F2$ as "readout windows", the sensor signals of the shift register 5 in the window $\phi F2$ have shifted by a signal width toward the left as shown in FIG. 3 in comparison to the window $\phi F1$. In the next readout cycle Z3, not shown in FIG. 3, in which the corresponding pulse $\phi F3$ comprises the same clock pulse periods as in Z2, the signals have then shifted in the window $\phi F3$ by a signal width toward the right with respect to FIG. 3. If the "window" is generally shifted in the first readout cycle Z1 and in the further readout cycles Z3, Z5, Z7 etc. by a respective clock period length toward the right, that corresponds to an alternating shift of the sensor signal sequences tapped at 5a or 4a by a signal width toward the left or right in the respective window $\phi F$. Those pulses $\phi F$ which would simultaneously embrace the evaluator signals derived from the line beginning and the line end of one of the sensor element lines are suppressed by the clock pulse generator 116. By so doing, it is achieved that the "windows" $\phi F$ switch off the evaluation of those sensor signals which where derived from the initial end sections of the projected line sections which stand next to one another in interposed relation, so that those signals convey no information concerning the actual luminosity course along the line section.

If the counting result which is supplied to the input 15a of the digital comparator is greater than the signal supplied to the other input 15b, the control inputs of the switches 16 and 29 are supplied with a comparator signal so that both switches transmit the signals applied to their respective inputs to their respective outputs. After the counting result of the number of coincidences occurring in the first readout cycle Z1 has been supplied as a first digital signal to the memory 14 and, through the memory 14, to the input 15a, only such a counting result of a further readout cycle Zi is subsequently transferred into the memory 17 which is greater than the greatest of those previously stored. The shift pulses P1, P2, ... occurring at the end of the readout cycles Z1, Z2 ... are counted in the counter 28. Because the switch 29 is actuated synchronously with the switch 16, the switch 29 always transfers the respective counter reading 28 to the memory 30 upon the occurrence of a greater counting result in the counter 10. Thus, after (n−1) information cycles, the number of shift pulses Pi which signify that information shift between the sensor signals of the shift registers 4 and 5 at which the greatest number of coincidence occurs, is stored in the memory 30. In other words, the number of shift pulses Pi stored in the memory 30 represents that relative shift of the sensor signals circulating in the shift registers 4 and 5 at which a maximum correlation of the sensor signals compared to one another exists.

Figure 3:
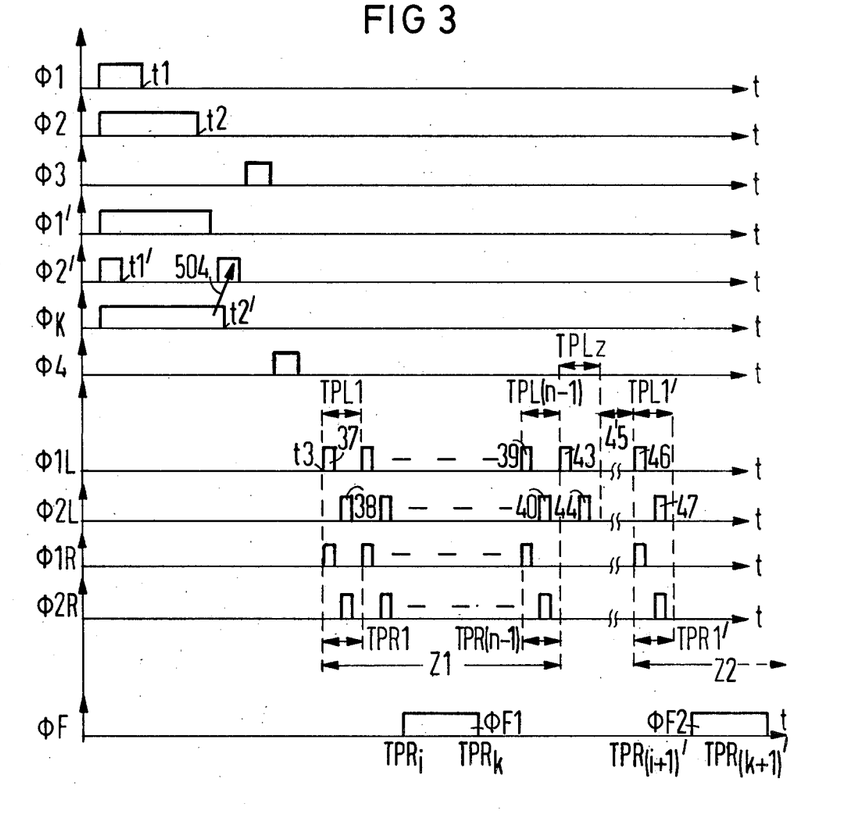
FIG. 3 is a voltage/time diagram for the clock pulse voltages for operating the circuits of FIGS. 1 and 2.

The blanking gaps 45 indicated in FIG. 3 which, for example, are required for the respective resetting of the counter 10 to 0, are generated by means of a corresponding blocking of the gate circuits 119 and 120 by their respective control lines 123 and 124.

The digital signal occurring at the output 31 of the memory 30 is supplied to an output device 32 which may be a display means which, after a corresponding coding of the digital signal, supplies a digital or analog display of the range of the object. The device 32 may also be an adjustment means for a photographic or electronic camera of the type known in the art which adjusts the distance of a lens movable with respect to an image plane so as to sharply focus the object on the image plane. A device of this type is described, for example, in German patent application Pat. No. 28 13 915.3 and in the previously cited "Electronics" article.

Figure 4:
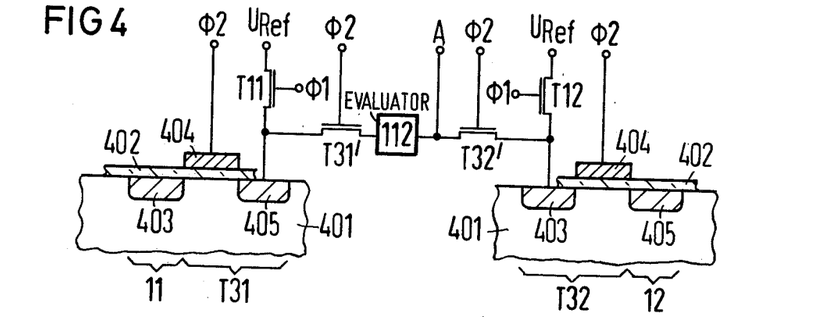
FIG. 4 is a schematic circuit diagram, partly in section, for sensor elements utilizable in the circuit of FIG. 1.

FIG. 4 is a schematic representation of one embodiment of the sensor elements 11 through 1n and 21 through 2n including adjacent circuit elements already identified in FIG. 1 and bearing identical reference numerals. As shown in FIG. 4, a thin electrically insulating layer 402 which may, for example, consist of silicon dioxide, is disposed on a doped semiconductor body 401 which may, for example, consist of p-doped silicon. The sensor element 11 is a photodiode which consists of an n-doped semiconductor region 403 in the semiconductor body 401. This region also simultaneously forms the source region for the transistor T31. The gate of the transistor T31 is arranged on the insulating layer 402 referenced at 404. The drain region of the transistor T31 is referenced at 405. By the transistor T11, the oppositely doped region 405 is connected to a terminal which is supplied with the constant voltage $U_{Ref}$ and is also connected through T31' to the input of the evaluator 112. The second input of the evaluator 112 is connected via the transistors T32 and T32' to the sensor element 12 which has parts constructed in an analogous manner. The drain region of the transistor T32 is connected to the reference voltage $U_{Ref}$ via a transistor T12. The output of the evaluator 112 is referenced at A.

Figure 5:
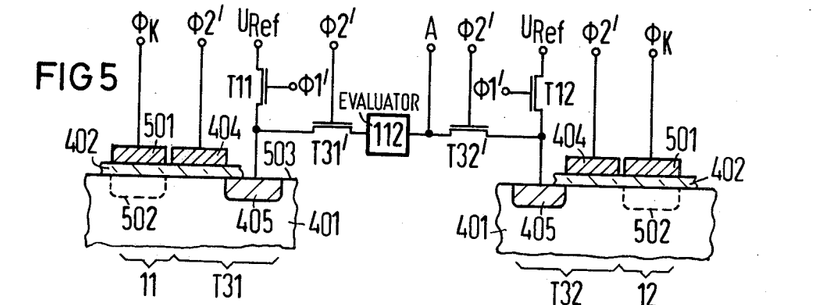
FIG. 5 is a schematic circuit diagram, partly in section, of a second embodiment of sensors utilizable in the circuit of FIG. 1.

A second embodiment for the sensor elements is shown in FIG. 5 wherein the sensor element 11 consists of a metal-insulator-semiconductor (MIS) capacitor having a gate 501 disposed on the insulation layer 402. The gate 501 may, for example, consist of highly doped polycrystalline silicon and is supplied with a clock voltage $\phi_K$ which results in the generation of an depletion zone 502 in the semiconductor body 401. The further circuit elements of FIG. 5 correspond to those circuit elements in FIG. 4 and are identically referenced. In the circuit of FIG. 5, however, the transistors T11 and T12 are supplied with a clock pulse voltage $\phi1'$ and the transistors T31 and T32 as well as T31' and T32' are connected with a clock pulse voltage $\phi2'$. The simultaneously beginning clock pulses $\phi1'$, $\phi2'$ and $\phi_K$ effect a resetting up to time t1' of the MIS capacitor in the area of the boundary surface 503 of the semiconductor body 401 which approximates the value of the reference voltage $U_{Ref}$. At a time t1', the integration time during which the optically generated charge carriers are collected begins in the MIS capacitor and continues as long as the electrode 501 is supplied with a pulse $\phi_K$. At the end of the pulse $\phi_K$ at a time t2', the end of the integration time is reached, as shown in FIG. 3. Shortly before the time t2', a new clock pulse $\phi2'$ is applied so that a charge transfer, indicated by the arrow 504, occurs from the sensor element 11 to the region 405 with the charge transfer producing a corresponding change of potential at the input of the evaluator 112. The clock pulse $\phi1'$ must, as is shown in FIG. 3, be switched off before this charge transfer occurs.

Figure 6:
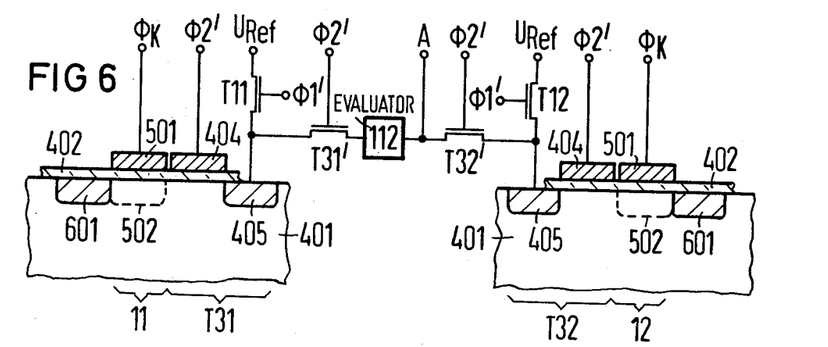
FIG. 6 is a schematic circuit diagram, partly in section, of a third embodiment of sensors utilizable in the circuit of FIG. 1.

FIG. 6 shows a further embodiment for the sensor elements wherein a photodiode 601 is disposed next to the MIS capacitor formed by the electrode 501, the insulating layer 402 and the zone 502 on the side facing away from the transistor T31. The gate electrodes of the transistors T31 and T32 as well as T31' and T32' are connected to the clock pulse voltage $\phi2'$, whereas the gate electrodes of the transistors T11 and T12 are connected to the clock pulse voltage $\phi1'$.

The capacitance of the sensor elements 11 and 12 shown in FIG. 5 is greater than the capacitance of the same sensor elements in FIG. 4, whereas the capacitance of the sensor elements 11 and 12 shown in FIG. 6 is greater than that of the sensor elements shown in FIG. 5.

Figure 7:
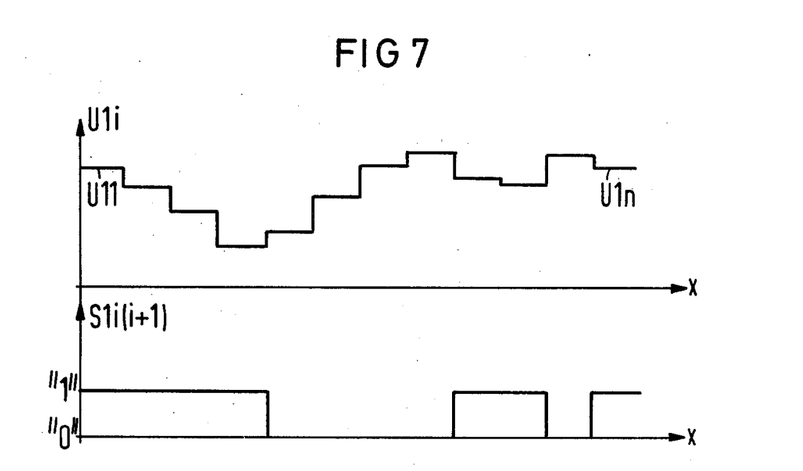
FIG. 7 is a voltage/time diagram illustrating the digitalization of sensor signals in the circuit of FIG. 1.

A sequence of analog sensor signals U1i is shown in FIG. 7 which occur at the outputs of the sensor elements 11 through 1n over the length x of the image sensor S1. The signal of the sensor element 11 is referenced at U11 while that of the sensor element 1n is referenced at U1n. The lower portion of FIG. 7 shows the associated digitalized evaluator signals S1i(i+1)

which are likewise shown over the distance x. As shown in FIG. 7, the logic signal 1 is obtained for each voltage change which occurs in the upper portion of FIG. 7 from a greater voltage level to a smaller voltage level while a logical signal 0 is obtained for each voltage change from a smaller to a greater voltage level. In this manner, a digital encoding of the sensor signals occurs which results only from the relative size changes of the signals U1i along the line of the image sensor S1.

Figure 8:
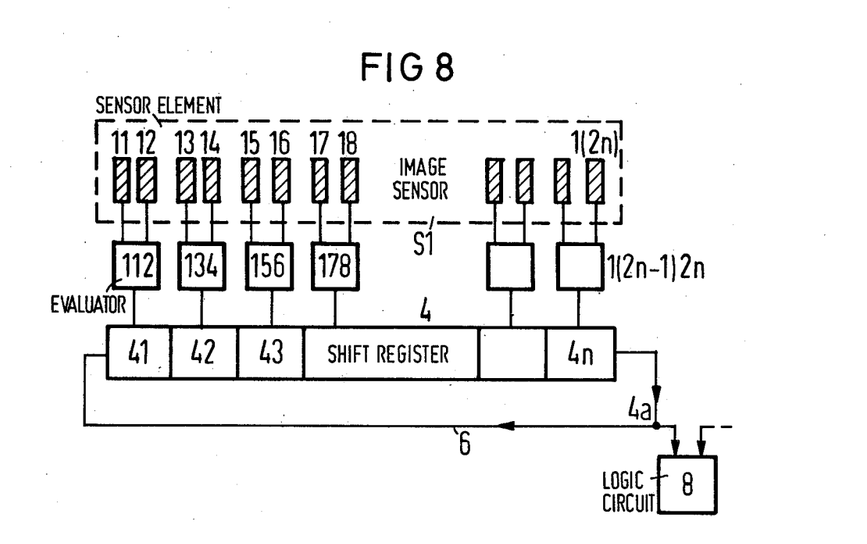
FIG. 8 is a second embodiment of a portion of the circuit shown in FIG. 1.

A second embodiment of the sensor and evaluator arrangement which may be utilized in the circuit of FIG. 1 is shown in FIG. 8 wherein the sensor elements of the image sensor S1 in the longitudinal direction of the image sensor have a narrow dimension so as to correspond to approximately half of the dimension of the evaluators. For reasons of clarity and simplification, the switching transistors associated with each sensor element and evaluator have been omitted, and may be assumed to be contained within each evaluator. The sensor elements are referenced at $11, 12, 13 \ldots 1(2n)$ and the outputs of adjacent sensor elements, for example 11 and 12, are connected to the two inputs of an evaluator, for example 112. The evaluators are numbered with a numeral 1 followed by the numbers corresponding to the two sensor elements connected thereto, ending with $1(2n-1)2n$. The use of a separate sensor element for each evaluator input prevents a feedback of an evaluator to the input of a neighboring evaluator via the connection line between the two inputs of the evaluators, even in the absence of the transistors T31', T32', T32'' through T3n' shown in FIG. 1. The same configuration as shown in FIG. 8 with regard to the image sensor S1 can be utilized for the image sensor S2 and the evaluators associated therewith shown in FIG. 1.

Figure 9:
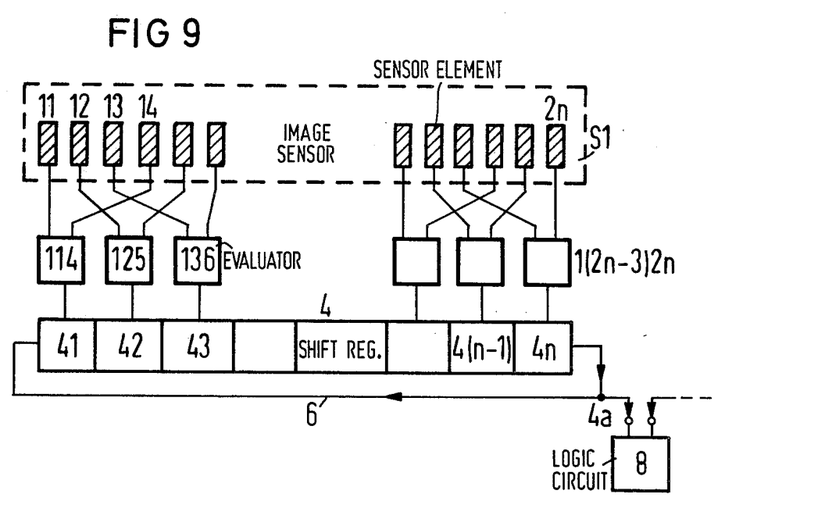
FIG. 9 is a third embodiment of a portion of the circuit shown in FIG. 1.

A further embodiment is shown in FIG. 9 which differs from that shown in FIG. 8 only in that each of the evaluators 114 through $1(2n-3)2n$ is connected at its two inputs to the outputs of two sensor elements which are separated from one another by two interceding sensor elements. The evaluators are again numbered accordingly with a numeral 1 followed by the two numbers of the sensors connected to the inputs thereof. In this embodiment, the luminosity contrast which is evaluated by the two sensor elements connected to a single evaluator is greater than in the arrangement of FIG. 8 wherein the two sensor elements for each evaluator are disposed immediately adjacent to each other. The digitalization of the sensor signals in the embodiment of FIG. 9 thus leads to a particularly reliable telemetry or focusing.

Figure 10:
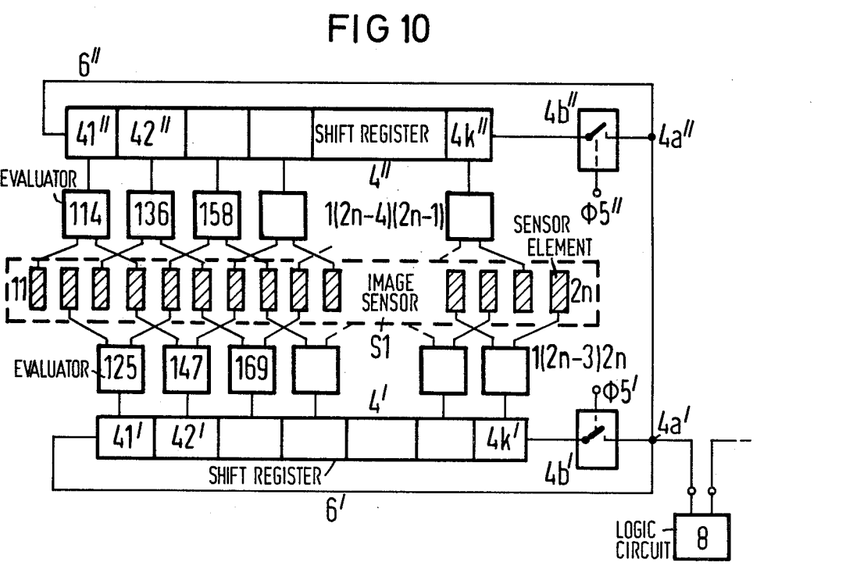
FIG. 10 is a variation of the circuit shown in FIG. 9.

Another embodiment is shown in FIG. 10 wherein the evaluators 114, 125, 136, 147 etc. are connected to the sensor elements 11 through 2n in accord with FIG. 9, however, with the difference that in FIG. 10 one line of evaluators 114 through $1(2n-4)(2n-1)$ is disposed on one side of the image sensor and the remaining evaluators 125, 147 through $1(2n-3)2n$ are disposed on the opposite side of the image sensor. By this arrangement, the number of cross over points of the connecting lines between the evaluators and sensor elements is reduced and the resolution is doubled. The lower row of evaluators 125 through $1(2n-3)2n$ has individually allocated thereto the stages 41', 42' through 4k' of a shift register 4' having an output 4a' connected by a line 6' to the input of the stage 41' and as well to the logic circuit 8. In an analogous manner, the upper row evaluators 114 through $1(2n-4)(2n-1)$ is allocated to stages 41'', 42'' through 4k'' of a shift register 4'' having an output 4a'' which is connected to the output 4a' as well as to the input of the stage 41'' via a line 6''. Electronic switches 4b' and 4b'', having control inputs connected to respective clock pulse voltages $\phi5'$ and $\phi5''$ are connected in series to the outputs 4a' and 4a''. Clock pulse voltages having clock periods respectively separated from one another by intermediate periods having the same length as the clock periods are supplied to the shift register 4'. The clock periods of the clock pulse voltages respectively supplied to the shift register 4'' are disposed in these intermediate periods. If a pulse $\phi5'$ now occurs within a clock period of the shift register 4' and a pulse $\phi5''$ occurs within the next successive clock period of the shift register 4'', the digitalized sensor signals of the evaluators $1(2n-3)2n$, $1(2n-4)(2n-1)$ etc. will be read out serially at the output 4a', with the switches operating in alternating fashion.

Figure 11:
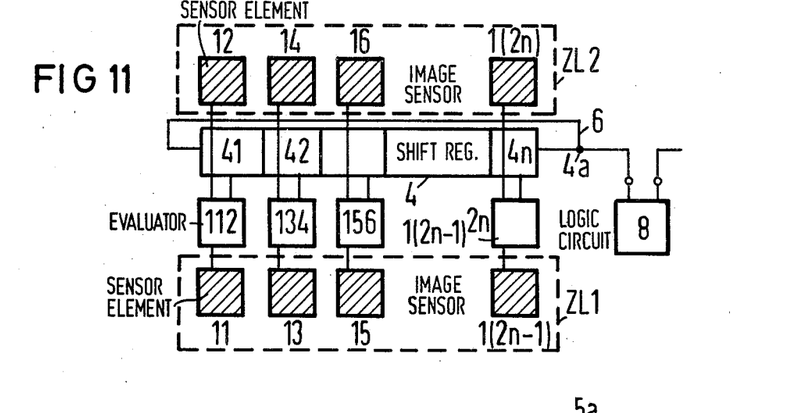
FIG. 11 is a fourth embodiment of a portion of the circuit shown in FIG. 1.

Another embodiment is shown in FIG. 11 wherein the sensor elements 11 through $1(2n-1)$ are connected to the same evaluators as in FIG. 8, however, with the difference that two sensor elements such as, for example, sensor elements 11 and 12, which are connected to one evaluator are not disposed next to one another in a sensor line, but rather are disposed in two lines ZL1 and ZL2. By this arrangement, the sensor elements have a distance from one another which, for example, may correspond to the dimension of two sensor elements. An exact and reliable digitalization ensues by means of the greater brightness contrast which is gained from the projected line section via the sensor elements arranged at an interval from one another. A serial readout of the output signals of all evaluators ensues via the output 4a through a shift register 4 which is disposed in such a manner that the stages 41, 42 . . . 4n connected to the evaluators respectively lie between the allocated evaluator and a sensor element connected thereto.

Figure 12:
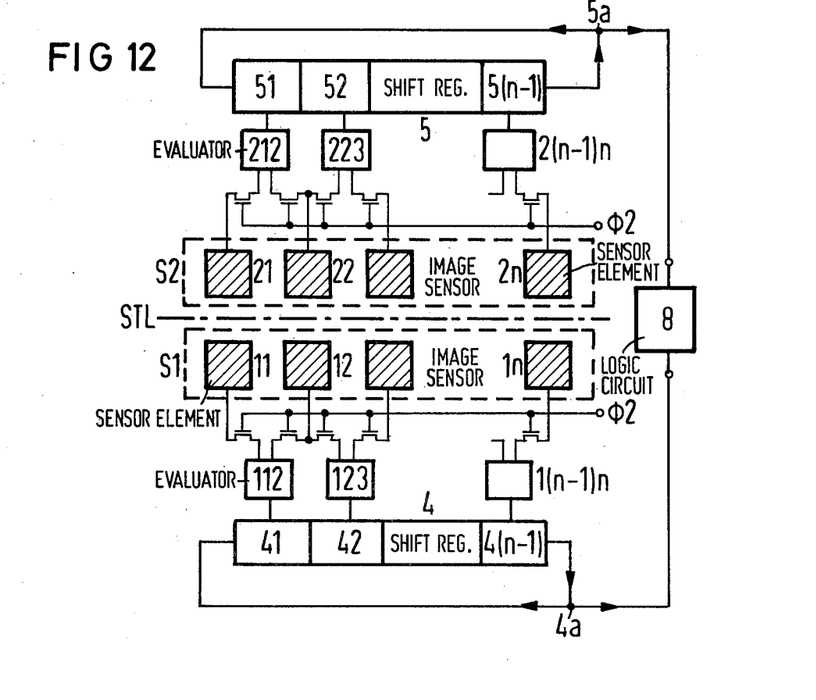
FIG. 12 is a fifth embodiment of a portion of the circuit shown in FIG. 1.

A further embodiment is shown in FIG. 12 which illustrates a circuit wherein the two image sensors S1 and S2 are disposed adjacent to each other so that the sensor elements 11 through 1n and 21 through 2n are in registry. The evaluators 112 through $1(n-1)n$ and 212 through $2(n-1)n$ are respectively disposed on opposite sides of the image sensors S1 and S2. The shift registers 4 and 5 are connected to the evaluators in the manner described in connection with FIG. 1. The embodiment shown in FIG. 12 may be employed if the imagings of the object are not only half-projected on the plane of the image sensors S1 and S2, whereby an upper half of one imaging falls on a part of the image plane which lies above the center line STL, and the lower half of the other imagings is projected on that part of the image plane lying below the center line STL. The line sections evaluated by means of the image sensors S1 and S2 in FIG. 12 thereby lie at the respective boundaries of the imaging halves which are adjacent to the line STL. Such a type of imaging projection is generally described in the German patent application Pat. No. 28 38 647.2.

It will be apparent to those skilled in the art that the circuits described above may be entirely or partially monolithically integrated on a doped semiconductor body which may, for example, be p-conductive and the remaining circuit structure integrated utilizing metal-oxide-semiconductor (MOS) n-channel technology. The semiconductor body lies at a reference potential whereby the specified voltages and potentials have a positive operational sign with respect thereto. The circuit may also be realized with an n-conductive semiconductor body and MOS p-channel technology, in which case the operational signs will be reversed.

Moreover, the switching transistors T31 through T3n and T41 through T4n shown in FIG. 1 may be omitted, whereby the switching function of T31 is assumed by T31', the switching function of T32 is assumed by the transistors T32' and T32", and so forth.

Although other modifications and changes may be suggested by those skilled in the art, it is the intention of the inventor to embody within the patent warranted hereon, all changes and modifications as reasonably and properly come within the scope of his contribution to the art.

I claim as my invention:

1. A circuit for sensor-controlled telemetry for use with a post-connected output device for converting signals from said circuit into signals operational for range indication or for range adjustment, said circuit comprising:

two linear image sensors each having a plurality of opto-electronic sensor elements for generating charge carriers and a corresponding potential in an amount proportional to radiation incident on said sensor elements, corresponding lines of two separately obtained imagings of an object being respectively projected onto said image sensors;

a group of evaluators associated with each image sensor, each evaluator having a pair of inputs individually connected to the respective outputs of two closely disposed sensor elements, said evaluators being digital comparators switchable at an output between two digital logic stages as a function of a comparison of the amounts of charge carriers generated by the sensors connected thereto;

a plurality of gate-controlled switching transistors interconnected between said sensors and said evaluators for controlling an integration time during which charge carriers are collected in said sensor elements;

at least two shift registers having stages respectively post-connected to each said group of evaluators associated with each image sensor;

each said shift register shifting the information contained therein a pre-determined number of times during a readout cycle; and a processing stage post-connected to each shift register including a counter and associated logic circuitry for counting the number of coincident digital signals from said shift registers after each shift of information therein and determining therefrom a maximum position correlation of said signals from said image sensors, and having an output from which the maximum correlation is supplied to said output device.

2. The circuit of claim 1 wherein said sensor elements in each image sensor have a dimension in the longitudinal direction of said image sensor equal to substantially one half of a dimension of an evaluator in said longitudinal direction.

3. The circuit of claim 1 wherein each said evaluator is a flip-flop circuit having a pair of circuit nodes connected to a constant voltage source through respective switching transistors.

4. The circuit of claim 1 wherein said sensor elements are photodiodes.

5. The circuit of claim 1 wherein said sensor elements are metal-insulator-semiconductor capacitors.

6. The circuit of claim 1 wherein said sensor elements are each comprised of an adjacent metal-insulator-semiconductor capacitor and photodiode.

7. The circuit of claim 1 wherein said sensor elements connected to said pair of inputs of each evaluator are adjacent sensor elements in said image sensors.

8. The circuit of claim 1 wherein said evaluators associated with each image sensor are disposed in a row on each side of said image sensor and wherein each row of evaluators has a respective shift register allocated thereto with alternatingly actuatable electronic switches disposed between said shift registers and said processing stage.

9. The circuit of claim 1 wherein said evaluators associated with each image sensor are disposed in a row and wherein said sensor elements for each image sensor are disposed in parallel lines on opposite sides of said evaluators with two sensor elements in registry from each line being connected to said pair of inputs for each evaluator.

10. The circuit of claim 9 wherein a shift register associated with each image sensor is disposed between said row of evaluators and one of said lines of sensor elements.

11. The circuit of claim 1 wherein said image sensors are parallelly disposed along a greatest dimension thereof and wherein said associated evaluators and shift registers are disposed on opposite sides thereof.

* * * * *